(12) United States Patent
Iseki

(10) Patent No.: US 9,211,614 B2
(45) Date of Patent: *Dec. 15, 2015

(54) BI—AL—ZN—BASED PB-FREE SOLDER ALLOY

(75) Inventor: Takashi Iseki, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/702,407

(22) PCT Filed: Jun. 3, 2011

(86) PCT No.: PCT/JP2011/062792
§ 371 (c)(1),
(2), (4) Date: Dec. 6, 2012

(87) PCT Pub. No.: WO2011/158668
PCT Pub. Date: Dec. 22, 2011

(65) Prior Publication Data
US 2013/0078138 A1  Mar. 28, 2013

(30) Foreign Application Priority Data
Jun. 16, 2010 (JP) ................. 2010-137036

(51) Int. Cl.
*B23K 35/26* (2006.01)
*B21C 23/08* (2006.01)
*B23K 35/02* (2006.01)
*B23K 35/40* (2006.01)
*C22C 12/00* (2006.01)

(52) U.S. Cl.
CPC ............... *B23K 35/264* (2013.01); *B21C 23/08* (2013.01); *B23K 35/0261* (2013.01); *B23K 35/40* (2013.01); *C22C 12/00* (2013.01); *B23K 2201/36* (2013.01)

(58) Field of Classification Search
CPC ..................................................... C22C 12/00
USPC ....................................................... 420/577
See application file for complete search history.

(56) References Cited

U.S. PATENT DOCUMENTS 3,010,821 A * 11/1961 Platt et al. ........................ 75/705
2010/0035072 A1 * 2/2010 Watanabe et al. ............. 428/457

FOREIGN PATENT DOCUMENTS

| JP | H8-215880 | 8/1996 |
|---|---|---|
| JP | H11-77366 | 3/1999 |
| JP | 2001-353590 | 12/2001 |
| JP | 2002-160089 A1 | 6/2002 |
| JP | 2004-25232 A1 | 1/2004 |
| JP | 2005-161397 A1 | 6/2005 |
| JP | 3671815 B2 | 7/2005 |
| JP | 2006-167790 A1 | 6/2006 |
| JP | 2007-181880 A1 | 7/2007 |
| JP | 2007-281412 A1 | 10/2007 |

OTHER PUBLICATIONS

Sezen Aksöz, et al., Thermal conductivity and interfacial energy of solid Bi solution in the Bi—Al—Zn eutectic system, Fluid Phase Equilibria vol. 293, Issue 1, Jun. 15, 2010, pp. 32-41 (available online Feb. 24, 2010).*

Machine translation of JP 2005-161397 (Japanese document published Jun. 23, 2005).*

International Search Report for International Application No. PCT/JP2011/062792 dated Jul. 26, 2011.

* cited by examiner

*Primary Examiner* — Jessee Roe
*Assistant Examiner* — Christopher Kessler
(74) *Attorney, Agent, or Firm* — Kratz, Quintos & Hanson, LLP

(57) ABSTRACT

A Pb-free solder alloy whose residual stress during solidification is small and which achieves high joint strength and high reliability, can suppress a reaction between Ni and Bi or diffusion of Ni when used to join Ni-containing electronic parts or substrates, and can withstand a high reflow temperature. A first aspect of a Pb-free solder alloy consists of 0.03% by mass or more but 0.70% by mass or less of Al, 0.2% by mass or more but 14.0% by mass or less of Zn, and the balance being Bi except for inevitable impurities. A second aspect of a Pb-free solder alloy consists of 0.03% by mass or ore but 0.70% by mass or less of Al, 0.2% by mass or more but 14.0% by mass or less of Zn, not more than 0.500% by mass of P, and the balance being Bi except for inevitable impurities.

3 Claims, No Drawings

BI—AL—ZN—BASED PB-FREE SOLDER ALLOY

BACKGROUND OF THE INVENTION

1. Field of the Invention

The present invention relates to a Pb-free solder alloy, particularly to a Bi—Al—Zn-based Pb-free solder alloy.

2. Description of the Related Art

In recent years, restrictions on chemical substances harmful to the environment have become increasingly stringent, and restrictions on solder materials used to join electronic parts or the like to substrates are no exception. From long ago, Pb (lead) has been continued to be used as a main component of solder materials, but has already been designated as a restricted substance by, for example, RoHS Directive. For this reason, solders containing no Pb (hereinafter, also referred to as "Pb-free solders") have been actively developed.

Solders used to join electronic parts to substrates are broadly divided into high-temperature solders (about 260° C. to 400° C.) and low- and middle-temperature solders (about 140° C. to 230° C.) based on their service temperature limits. Among them, as for low- and middle-temperature solders, Pb-free solders mainly containing Sn have already been practically used. For example, Japanese Patent Kokai No. 11-077366 discloses a Pb-free solder alloy composition containing Sn as a main component, 1.0 to 4.0% by mass of Ag, 2.0% by mass or less of Cu, 0.5% by mass or less of Ni, and 0.2% by mass or less of P. Japanese Patent Kokai No. 8-215880 discloses a Pb-free solder alloy composition containing 0.5 to 3.5% by mass of Ag, 0.5 to 2.0% by mass of Cu, and the balance Sn.

On the other hand, high-temperature Pb-free solder materials also have been developed by various organizations. For example, Japanese Patent Kokai No. 2002-160089 discloses a Bi/Ag brazing filler material containing 30 to 80% by mass of Bi and having a melting temperature of 350 to 500° C. Japanese Patent Kokai No. 2006-167790 discloses a solder alloy obtained by adding a binary eutectic alloy to a eutectic alloy containing Bi and by further adding an additive element thereto, and describes that this solder alloy is a quaternary or higher solder, that is, a multi-component solder, but it is possible to adjust its liquidus-line temperature and to reduce variations in composition.

Japanese Patent Kokai No. 2007-281412 discloses a solder alloy obtained by adding Cu—Al—Mn, Cu, or Ni to Bi, and describes that when such a solder alloy is used to join a power semiconductor device having a Cu surface layer to an insulator substrate having a Cu surface layer, an undesired reaction product is lese likely to be formed at a joint interface between the solder and each of the Cu layers so that the occurrence of defects such as cracks can be suppressed.

Japanese Patent No. 3671815 discloses a solder composition containing, based on the total mass of the solder composition, 94.5% by mass or more of Bi as a first metal element, 2.5% by mass of Ag as a second metal element, and a total of 0.1 to 3.0% by mass of at least one selected from the group consisting of Sn: 0.1 to 0.5% by mass, Cu: 0.1 to 0.3% by mass, In: 0.1 to 0.5% by mass, Sb: 0.1 to 3.0% by mass, and Zn: 0.1 to 3.0% by mass as a third metal element.

Japanese Patent Kokai No. 2004-025232 discloses a Pb-free solder composition containing a Bi-based alloy containing at least one of Ag, Cu, Zn, and Sb as an accessory component and 0.3 to 0.5% by mass of Ni, and describes that this Pb-free solder has a solidus-line temperature of 250° C. or higher and a liquidus-line temperature of 300° C. or less. Japanese Patent Kokai No. 2007-181880 discloses a binary alloy containing Bi, and describes that this binary alloy has the effect of suppressing the occurrence of cracking in the inside of a soldering structure.

SUMMARY OF THE INVENTION

As described above, high-temperature Pb-free solder materials have been developed by various organizations, but the fact is that no solder material having characteristics acceptable for practical use has yet been found.

In general, materials having relatively low upper temperature limits such as thermoplastic resins and thermosetting resins are often used for electronic parts and substrates, and therefore a working temperature needs to be less than 400° C., preferably 370° C. or less. However, in the case of, for example, the Bi/Ag brazing filler material disclosed in Japanese Patent Kokai No. 2002-160089, its liquidus-line temperature is as high as 400 to 700° C., and therefore it is estimated that a working temperature during joining is 400 to 700° C. or higher. In this case, the working temperature exceeds the upper temperature limits of electronic parts or substrates to be joined.

In the case of solder alloys mainly containing Bi, it is necessary to solve problems specific to Bi-based solder alloys, that is, problems with deterioration of various joining characteristics caused by a reaction between Bi and Ni and deterioration of various joining characteristics caused by residual stress resulting from expansion of Bi during solidification.

More specifically, when an electronic part has a Ni surface layer to improve joinability with a solder alloy, there is a case where this Ni layer rapidly reacts with Bi contained in the solder alloy to form a brittle Ni—Bi alloy and diffusion of Ni into Bi occurs due to breakage or separation of the Ni layer so that the joint strength of the solder alloy is significantly lowered. There is a case where a Ag or Au layer is provided on the Ni layer. In this case, however, Ag or Au is used to prevent oxidation of the Ni layer or to improve wettability, and therefore the Ag or Au immediately diffuses into the solder alloy and hardly has the effect of suppressing the diffusion of Ni.

In Japanese Patent Kokai No. 2007-281412, there is a description about comparative examples in which a surface layer to be joined with a solder alloy is formed of a Ni layer, that is, the surface layer is not formed of a Cu layer. Japanese Patent Kokai No. 2007-281412 describes that the solder alloy obtained by adding Cu—Al—Mn, Cu, or Ni to Bi produces a large amount of $Bi_3Ni$ at a joint interface and many voids are observed around it. Further, Japanese Patent Kokai No. 2007-281412 describes that it has been confirmed that $Bi_3Ni$ is very brittle and it is difficult to achieve reliability as determined by a heat cycle test performed under severe conditions.

As described above, in the case of the Pb-free solder composition disclosed in Japanese Patent Kokai No. 2004-025232, a brittle Ni—Bi alloy is formed. As can be seen from a Bi—Ni binary phase diagram, when a large amount of Bi is present, a brittle $Bi_3Ni$ alloy is formed. When Ni is contained in an amount of 0.3 to 0.5% by mass, a very brittle alloy phase is dispersed in the solder, and therefore it is estimated that the inherently-brittle Bi-based solder is made more brittle.

In Japanese Patent Kokai No. 2006-167790 and Japanese Patent Kokai No. 2007-181880, there are no description about the problem of diffusion of Ni into Bi nor measures to prevent it. Particularly, Japanese Patent Kokai No. 2007-181880 discloses a Bi—Ag-based solder, a Bi—Cu-based solder, and a Bi—Zn-based solder, but it does not describe measures against the diffusion of Ni at all in spite of the fact that, in the case of the Bi—Ag-based solder, it is particularly necessary to take measures against the diffusion of Ni. The present inventor has confirmed that, in the case of the Bi—Cu-based solder, the amount of solid solution of Cu in Bi is very small and therefore a Cu phase having a high melting point is deposited, which leads to a problem with joinability. However, Japanese Patent Kokai No. 2007-181880 does not describe measures against it. Further, in the case of the Bi—Zn-based solder, it is estimated that wettability is lowered due to the strong reducing character of Zn and therefore it is difficult to join electronic parts or the like. However, Japanese Patent Kokai No. 2007-181880 does not refer to it and does not describe a reaction between Ni and Bi, either.

As described above, Japanese Patent No. 3671815 discloses a solder composition containing 2.5% by mass of Ag. However, the present inventor has experimentally confirmed that this solder composition is not acceptable for practical use due to its low joint strength. This is because Ag promotes a reaction between Bi and Ni, and therefore a reaction between Bi and Ni and diffusion of Ni into Bi cannot be suppressed even by, for example, adding Sn in an amount of 0.5% by mass or more and Zn in an amount of 3.0% by mass or more.

Hereinbelow, residual stress caused by expansion of Bi during solidification and problems with deterioration of various joining characteristics caused by the expansion will be described. Japanese Patent No. 3671815 describes that an effective measure to suppress damage to substrates during soldering is to relieve stress produced during solidification of solder, and also describes that, for this purpose, an element that does not shrink during solidification is selected as a member constituting an alloy composition. Japanese Patent No. 3671815 discloses, as examples of such an element that constitutes an alloy composition and does not shrink during solidification, metal elements that show volume expansion during solidification such as Bi and Ga. Further, Japanese Patent No. 3671815 describes that Bi has been selected as a main component of a solder composition and a Bi-2.5 wt % Ag solder composition has been regarded as promising in consideration of its melting point and workability.

However, the shrinkage ratio of Bi during solidification is −3.2% to −3.4% and the shrinkage ratio of Ag during solidification is +6.4 to +6.8% ("−" represents expansion and "+" represents shrinkage), and therefore when the amount of Ag added is 2.5% by mass, the degree of expansion caused by Bi during solidification is still too large so that residual stress is produced. From this, it can be considered that it is difficult to suppress possible damage to substrates during soldering and to achieve joinability and reliability acceptable for practical use.

Hereinbelow, the melting point of a solder alloy will be described. The reflow temperature of high-temperature soldering is generally said to be about 260° C., but in practical application, it is often set to a temperature higher than 260° C. depending on particular manufacturing conditions. Therefore, there is a demand for a solder material having a solidus temperature as high as possible to withstand a reflow temperature in consideration of a range of high reflow temperatures to be set for the high-temperature soldering.

However, in the case of, for example, the Bi—Ag alloy disclosed in Japanese Patent No. 3671815, the solidus temperature thereof is 262° C., and when a third element or more is added to this alloy, the solidus temperature is further lowered. The solidus temperature of the Bi—Zn alloy disclosed in Japanese Patent Kokai No. 2007-181880 is 254.5° C. Accordingly, it is estimated that the alloy faces difficulty to continue to fix electronic parts when a reflow temperature is as high as 300° C.

As described above, when an electronic part and a substrate are joined together using a high-temperature Bi-based Pb-free solder alloy, residual stress is produced due to expansion of Bi during solidification and therefore the joint strength of the solder alloy is lowered, which makes it difficult to achieve medium- to long-term durability. In order to improve joint strength and reliability, reduction in residual stress produced by volume expansion during solidification is a major challenge to be addressed.

In addition to that, when Ni is present in the electronic part or the substrate, a reaction between Ni and Bi occurs so that a brittle alloy is formed and Ni diffuses into the Bi solder. Therefore, suppression of the reaction between Ni and Bi or the diffusion of Ni into Bi is also a challenge to be addressed to improve joint strength and reliability. Further, it is desirable to increase the solidus temperature of the Bi-based solder alloy by even 1° C. in order to withstand a higher reflow temperature.

It is an object of the present invention to provide a Bi-based Pb-free solder alloy whose residual stress during solidification is small and which achieves high joint strength and high reliability, can suppress a reaction between Ni and Bi or diffusion of Ni when used to join Ni-containing electronic parts or substrates, and can withstand a high reflow temperature.

In order to achieve the above object, a first aspect of a Pb-free solder alloy according to the present invention consists of 0.03% by mass or more but 0.70% by mass or less of Al, 0.2% by mass or more but 14.0% by mass or less of Zn, and a balance being Bi except for inevitable impurities.

Further, a second aspect of a Pb-free solder alloy according to the present invention consists of 0.03% by mass or more but 0.70% by mass or less of Al, 0.2% by mass or more but 14.0% by mass or less of Zn, not more than 0.500% by mass of P, and a balance being Bi except for inevitable impurities.

According to the present invention, it is possible to reduce residual stress during solidification and to achieve high joint strength and high reliability. Further, it is also possible to suppress a reaction between Bi contained in a solder alloy and a Ni layer contained in an electronic part or the like or diffusion of Ni into a Bi-based solder. Further, it is also possible to achieve a solder alloy that can substantially withstand a reflow temperature of 265° C. or higher.

DETAILED DESCRIPTION OF THE PREFERRED EMBODIMENTS

A first aspect of a Pb-free solder alloy according to the present invention is a ternary Pb-free solder alloy containing Bi as a primary element, that is, as a main component. More specifically, the first aspect of the Pb-free solder alloy consists of 0.03% by mass or more but 0.70% by mass or less of Al, 0.2% by mass or more but 14.0% by mass or less of Zn, and the balance being Bi except for inevitable impurities. That is, the first aspect of the Pb-free solder alloy according to the present invention contains no elements other than Bi, Al, and Zn except for inevitable impurities. Particularly, the first aspect of the Pb-free solder alloy according to the present invention does not contain Sn.

When a Bi—Al—Zn-based Pb-free solder alloy mainly containing Bi, such as the above-described solder alloy, is used to join electronic parts or the like, a phenomenon occurs in which the solder alloy expands when cooled and solidified from a molten state. Such a phenomenon is very characteristic of Bi—Al—Zn-based Pb-free solder alloys mainly containing Bi. The expansion during solidification produces residual stress in the solder alloy or the electronic parts or the like. It is obvious that the residual stress lowers joint strength and durability.

The joined electronic parts of a resulting product are repeatedly heated and cooled because an electric current is intermittently fed to the electronic parts when the product is used, and therefore stress produced by repeated heating and cooling is also applied to the electronic parts. For example, the thermal expansion coefficient of Cu of a Cu substrate is about five times different from that of Si used for electronic parts, and therefore thermal stress is repeatedly applied by repeated heating and cooling. That is, solder joints of electronic parts or the like using a solder alloy mainly containing Bi have a potential problem leading to a significant degradation in reliability such as a problem that cracks are likely to be produced not only by residual stress during solidification but also by thermal stress applied during use.

In order to solve the problem, the first aspect of the Pb-free solder alloy according to the present invention contains Al that shrinks during solidification. That is, by adding Al, expansion of Bi is relieved by shrinkage of Al so that the volume expansion of Bi during solidification is relieved. This reduces a change in the volume of the entire solder alloy, thereby reducing the residual stress of the solder alloy.

In addition to that, it can be expected that Al has another important effect. That is, addition of Al makes it possible to increase the solidus temperature and liquidus temperature of the solder alloy. As can be seen from a Bi—Al binary phase diagram, the solidus temperature of Bi—Al is 270° C. that is substantially the same as the melting point of Bi (271° C.) Further, the liquidus temperature can be increased by adding a small amount of Al. This makes it possible to use the Bi-based solder at a higher temperature. As described above, addition of Al makes it possible to achieve both a reduction in residual stress and a high melting point and further to improve wettability due to the strong reducing character of Al (which will be described later).

The characteristics of such a Bi—Al alloy are further improved by adding Zn. That is, addition of Zn produces an Al—Zn alloy, which significantly improves processability at around a eutectic point. Further, Zn is highly reactive with Ni, and therefore an alloy layer is formed by reaction with a Ni layer. This alloy layer has the effect of suppressing the formation of a brittle phase caused by a reaction between Bi and Ni. As described above, Zn improves processability by forming an alloy with Al, and further suppresses a reaction between Bi and Ni so that the formation of a brittle Bi—Ni phase is suppressed, which effectively improves joint strength and reliability.

Hereinbelow, a second aspect of a Pb-free solder alloy according to the present invention will be described. The second aspect of the Pb-free solder alloy consists of 0.03% by mass or more but 0.70% by mass or less of Al, 0.2% by mass or more but 14.0% by mass or less of Zn, not more than 0.500% by mass of P, and the balance being Bi except for inevitable impurities.

The second aspect of the Pb-free solder alloy mainly contains Bi, and the Al content and Zn content of the second aspect of the Pb-free solder alloy are the same as those of the first aspect of the Pb-free solder alloy. Therefore, the second aspect of the Pb-free solder alloy can have the same excellent characteristics as the first aspect of the Pb-free solder alloy. The second aspect of the Pb-free solder alloy contains P in an amount of not more than 0.500% by mass if necessary. This allows the second aspect of the Pb-free solder alloy to have higher wettability than the first aspect of the Pb-free solder alloy. This is because, even when the Bi—Al—Zn solder alloy is low in wettability, the wettability of the solder alloy is improved by adding P in an amount of not more than 0.500% by mass due to the effective action of P having a strong reducing character.

Hereinbelow, each of the elements relating to the Pb-free solder alloy according to the present invention will be described in more detail.

<Bi>

Bi is a primary element, that is, main component of the high-temperature Pb-free solder alloy according to the present invention. Bi is a very brittle metal that belongs to the Va group (N, P, As, Sb, Bi) and has a trigonal (rhombohedral) crystal structure with low symmetry. When Bi is subjected to a tensile test, it can be easily confirmed that its fracture surface is a brittle fracture surface. That is, pure Bi is poor in ductility, and the coefficient of extension of Bi experimentally determined was less than 1.0%. Further, Bi is a special metal that expands during solidification, and the shrinkage ratio of Bi during solidification is −3.2% to −3.4% ("−" represents expansion, "+" represents shrinkage). Such expansion produces residual stress, which lowers joint strength and reliability. Further, Bi easily reacts with Ni to form a brittle alloy, which results in a problem that joinability is lowered.

In order to solve these problems such as brittleness of Bi, residual stress caused by expansion during solidification, and formation of a brittle phase caused by reaction with Ni, various elements described below are added. The type and amount of element to be added depend on which of the various characteristics of Bi such as brittleness is desired to be improved and on the desired degree of improvement. That is, the amount of Bi contained in the solder alloy is inevitably changed depending on the type and amount of element to be added. The reason why Bi has been selected among Va group elements is that Va group elements other than Bi are classified as semimetals or nonmetals and are more brittle than Bi and that the melting point of Bi is 271° C. that is higher than a reflow temperature of about 260° C. at which high-temperature solders are used.

<Al>

Al is an essential element to be added to the high-temperature Pb-free solder alloy according to the present invention. Addition of Al makes it possible to reduce residual stress produced by expansion of Bi during solidification and to achieve a high liquidus temperature and a high solidus temperature. In addition, it is also possible to obtain the effect of improving wettability. More specifically, as described above, the shrinkage ratio of Bi during solidification is −3.2% to −3.4%, whereas the shrinkage ratio of Al during solidification is +6.4% to +6.8%, and therefore, expansion of Bi can be relieved to some extent by adding Al. However, when a large amount of Al is added, the liquidus temperature of the solder alloy becomes too high to achieve a good joint. For this reason, there is a limit on the Al content of the solder alloy.

Al has the excellent effect of adjusting the melting point of the solder alloy, which is also an important role of Al. That is, even when Al is added, the solidus temperature of the solder alloy is hardly lowered and is kept at 270° C. Whereas, by adjusting the Al content of the solder alloy, it is possible to easily increase the liquidus temperature of the solder alloy. This allows the solder alloy to withstand a higher reflow temperature, and makes it possible to adjust the liquidus temperature of the solder alloy to a more desirable level. Further, Al itself is oxidized during joining with an electronic part due to its strong reducing character, and this oxidization also has the effect of significantly improving solder wettability.

As described above, Al is added in an appropriate amount in consideration of relief of residual stress, adjustment of the melting point of the solder alloy, and the characteristics of the solder alloy such as wettability. More specifically, Al is added so that the Al content of the solder alloy becomes 0.03% by mass or more but 0.70% by mass or less. If the Al content is less than 0.03% by mass, the amount of Al is too small to obtain the desired effects. On the other hand, the Al content exceeds 0.70% by mass, Al is segregated due to its high melting point, thereby causing a problem that joinability is lowered.

<Zn>

Similarly to Bi and Al, Zn is also an essential element to be added to the high-temperature Pb-free solder alloy according to the present invention. By adding Zn to a Bi—Al alloy, an Al—Zn alloy is produced so that crystals become very fine particularly in the vicinity of the eutectic structure of the Al—Zn alloy, thereby significantly improving processability. As descried above, the upper limit of the Al content of the solder alloy is 0.70% by mass that is not very high. Therefore, addition of Zn is highly effective to improve processability.

Further, Zn is highly reactive with Ni, and therefore reacts with a Ni layer to form an alloy layer. This plays an important role in suppressing the formation of a brittle phase caused by a reaction between Bi and Ni and further in suppressing the diffusion of Ni into Bi. As a result, the joint strength and reliability of the solder alloy are significantly improved. As described above, addition of Zn has the effects of improving processability, suppressing a reaction between Bi and Ni, and improving joint strength and reliability.

The optimum Zn content of the solder alloy to obtain such excellent effects depends on the area of a junction with an electronic part, the thickness of the solder, the thickness of a Ni layer, reflow temperature, reflow time and so on, but is substantially 0.2% by mass or more but 14.0% by mass or less. If the Zn content is less than 0.2% by mass, the amount of Zn is too small and therefore addition of Zn has no meaning. On the other hand, if the Zn content exceeds 14.0% by mass, the ratio of a liquid phase during reflow becomes too high because the solidus temperature of Bi—Zn is 254° C., and therefore there is a high possibility that the solder alloy cannot continue to fix electronic parts.

<P>

P is an element to be added if necessary. Addition of P makes it possible to further improve the wettability and joinabiilty of the Bi—Al—Zn alloy. The reason why addition of P has the effect of further improving wettability is that P has a strong reducing character and therefore P itself is oxidized, which suppresses the oxidation of the surface of the solder alloy.

Further, addition of P has the effect of suppressing formation of voids during joining. That is, as described above, P itself is easily oxidized, and therefore oxidation of P more preferentially proceeds during joining than oxidation of Bi that is a main component of the solder. As a result, oxidation of the parent phase of the solder can be prevented and the wettability of the solder can be ensured. This makes it possible to achieve a good joint, so that voids are less likely to be formed.

As described above, P has a very strong reducing character, and therefore, even when a very small amount of P is added, P exerts the effect of improving wettability. On the other hand, even when P is added in an amount larger than a given amount, the effect of improving wettability is not enhanced. If P is excessively added, there is a fear that an oxide of P is generated on the surface of the solder or P forms a brittle phase so that the solder is made brittle. For this reason, P is preferably added in a very small amount.

More specifically, the upper limit of the P content of the solder alloy is 0.500% by mass. If the P content exceeds the upper limit, there is a fear that an oxide of P covers the surface of the solder, which has an adverse effect on wettability. Further, the amount of solid solution of P in Bi is very small, and therefore if the P content is large, the reliability of the solder alloy is lowered due to, for example, segregation of a brittle oxide of P. Particularly, it has been confirmed that in the case of forming the solder alloy into, for example, a wire, a large P content is likely to cause breakage of the wire.

<Sn>

Hereinbelow, Sn will be described. One of the major objects of the present invention is to allow a Bi-based solder to withstand as high a reflow temperature as possible by increasing the solidus temperature of the Bi-based solder as much as possible. Addition of Sn to a Bi-based solder has various merits such as the effect of suppressing diffusion of Ni, but has a problem that the solidus temperature of the Bi-based solder is significantly lowered. More specifically, the solidus temperature of a Sn—Bi alloy is as very low as 139° C., and therefore it is considered that, depending on the Sn content of a solder alloy, when Sn is contained in the solder alloy in an amount of several percent by mass, a liquid phase is absolutely formed during reflow and therefore it is difficult for the solder alloy to continue to fix electronic parts. For this reason, the Pb-free solder alloy according to the present invention does not contain Sn.

The use of the above-described high-temperature Pb-free solder alloy according to the present invention to join electronic parts to substrates makes it possible to provide electronic circuit boards that exhibit durability and high reliability even when used under severe conditions such as an environment in which a heat cycle is repeated. Therefore, installation of such electronic circuit boards on, for example, power semiconductor devices such as thyristors and inverters, various control devices installed on cars and the like, and device used under severe conditions such as solar cells makes it possible to further improve the reliability of these various devices.

Examples

As raw materials, Bi, Al, and Zn each having a purity of 99.9% by mass or higher and P having a purity of 99.95% by mass or higher were prepared. When the raw materials were in a large slice form or bulk form, they were cut and pulverized into pieces having a size of 3 mm or less while attention was paid so that the composition of an alloy after melting would become uniform, that is, would not vary depending on sampling site. Then, predetermined amounts of these raw materials were weighed and placed in a graphite crucible for high-frequency melting furnace.

The crucible containing the raw materials was placed in a high-frequency melting furnace, and nitrogen was allowed to flow through the melting furnace at a flow rate of 0.7 L/min or higher per kilogram of the raw materials to suppress oxidation. In such a state, the melting furnace was turned on to heat and melt the raw materials. When started to be melted, the metals were sufficiently stirred with a mixing bar and uniformly mixed to avoid localized variations in composition. After it was confirmed that the metals had been sufficiently melted, a high-frequency power source was turned off, and the crucible was rapidly taken out of the melting furnace, and molten metal contained in the crucible was poured into a mold of a master solder alloy. The mold had the same shape as that usually used for manufacturing of solder alloys.

In this way, master solder alloys different in the mixing ratio among the raw materials were prepared as Samples 1 to 13. The composition of each of the master solder alloys of Samples 1 to 13 was analyzed by an ICP emission spectrometer (SHIMADZU S-8100). The results of analysis are shown in the following Table 1.

TABLE 1

| Samples | Solder Composition (% by mass) | | | |
|---|---|---|---|---|
| | Bi | Al | Zn | P |
| 1 | Balance | 0.05 | 3.1 | — |
| 2 | Balance | 0.30 | 3.0 | — |
| 3 | Balance | 0.61 | 2.9 | — |
| 4 | Balance | 0.32 | 0.71 | — |
| 5 | Balance | 0.31 | 5.96 | — |
| 6 | Balance | 0.30 | 13.2 | — |
| 7 | Balance | 0.30 | 3.1 | 0.005 |
| 8 | Balance | 0.31 | 2.9 | 0.246 |
| 9 | Balance | 0.30 | 3.0 | 0.451 |
| 10* | Balance | 3.51 | 6.1 | — |
| 11* | Balance | 0.29 | 0.12 | — |
| 12* | Balance | 0.60 | 40.3 | — |
| 13* | Balance | 0.31 | 6.1 | 1.024 |

Note:
Samples marked with * are Comparative Examples.

Then, each of the master solder alloys of Samples 1 to 13 shown in Table 1 was subjected to the following evaluation of formability into wire, evaluation of wettability (joinability), heat cycle test, and atmospheric heat resistance test. It is to be noted that the evaluation of solder wettability does not usually depend on the shape of solder, and therefore a solder to be evaluated may be formed into any shape such as a wire, ball, or paste. However, in this example, the Samples 1 to 13 to be evaluated were formed into a wire.

<Evaluation of Formability into Wire>

Each of the master solder alloys of Samples 1 to 13 shown in the above Table 1 was set in an extruder to be formed into a wire having an outer diameter of 0.80 mm. More specifically, the extruder was previously heated to a temperature suitable for the solder composition of each of the master solder alloys, and then each of the master solder alloys was set in the extruder. The wire-shaped solder extruded from the outlet of the extruder is still hot and therefore oxidation is likely to proceed. For this reason, the outlet of the extruder was allowed to have a sealed structure and an inert gas was introduced into the structure to reduce the concentration of oxygen as much as possible to prevent oxidation from proceeding. Pressure applied to the master solder alloy was hydraulically increased to form the master solder alloy into a wire by extrusion. The extrusion speed of the wire was previously adjusted so that breakage or deformation of the wire did not occur. Concurrently with extrusion, the wire was wound up by an automatic winder at the same speed.

In this way, each of the master solder alloys was formed into a wire and 60 m of the wire was wound up by an automatic winder. At this time, formability into wire of each of the master solder alloys was evaluated according to the following criteria.

good: No wire breakage occurred.
average: Wire breakage occurred one to three times.
poor: Wire breakage occurred four times or more.

<Evaluation of Wettability (Joinability)>

The wettability (joinability) of each of the mater solder alloys was evaluated using the wire-shaped solder alloy obtained for the above-described evaluation of formability into wire. First, a wettability tester (device name: atmosphere control-type wettability tester) was activated, a heater unit to be heated was doubly covered, and nitrogen was allowed to flow from four points around the heater unit (flow rate of nitrogen at each point: 12 L/min). Then, the heater unit was heated to a preset temperature of 340° C.

After the temperature of the heater became stable at 340° C., a Cu substrate (thickness: about 0.70 mm) having a Ni plated layer (thickness: 4.0 μm) and a Ag vapor-deposited layer (thickness: 0.15 μm) formed on the Ni plated layer was set in the heater unit and heated for 25 seconds. Then, the solder alloy was placed on the Cu substrate and heated for 25 seconds. After the completion of heating, the Cu substrate was removed from the heater unit, and was once moved to a place besides the heater unit for cooling where a nitrogen atmosphere was maintained. After being sufficiently cooled, the Cu substrate was exposed to the atmosphere to observe a joint part. The wettability of the solder was evaluated according to the following criteria.

poor: Joining was not successful.

average: Joining was successful but spreading of the solder was poor (a mound of the solder was observed).

good: Joining was successful and good spreading of the solder were achieved (the solder thinly spread over the surface of the Cu substrate).

<Heat Cycle Test>

The reliability of a solder joint was evaluated by a heat cycle test. This test was performed using a Cu substrate, having the solder alloy joined thereto, prepared in the same manner as in the evaluation of wettability. First, the Cu substrate having the solder alloy joined thereto was repeatedly subjected to a predetermined number of cooling and heating cycles, where each cycle consists of cooling at −40° C. and heating at 150° C. Then, the Cu substrate having the solder alloy joined thereto was embedded in a resin, and the cross section of the resin was polished to observe a joint surface by SEM (HITACHI S-4800). Evaluation was performed according to the following criteria.

poor: Separation of the joint surface or cracking of the solder was observed.

good: Such defects were not observed and the joint surface remained in its initial state.

<Atmospheric Heat Resistance Test>

The reliability of a solder joint was evaluated by an atmospheric heat resistance test. It is to be noted that this test was performed using the same Cu substrate having the solder alloy joined thereto as used in the heat cycle test. First, the Cu substrate was placed in an oven heated to 150° C. After a lapse of 1000 hours, the Cu substrate was taken out of the oven. Then, the Cu substrate having the solder alloy joined thereto was embedded in a resin, and the cross section of the resin was polished to observe a joint surface by SEM (HITACHI S-4800). Evaluation was performed according to the following criteria.

poor: Separation of the joint surface or cracking of the solder was observed.

good: Such defects were not observed and the joint surface remained in its initial state.

The results of the above-described evaluations and tests are shown in Table 2.

TABLE 2

| Samples | Formability | Wettability | Heat Cycle Test (times) 300 | Heat Cycle Test (times) 500 | Atmospheric Heat Resistance Test |
|---|---|---|---|---|---|
| 1 | good | good | good | good | good |
| 2 | good | good | good | good | good |
| 3 | good | good | good | good | good |
| 4 | good | good | good | good | good |
| 5 | good | good | good | good | good |
| 6 | good | good | good | good | good |
| 7 | good | good | good | good | good |
| 8 | good | good | good | good | good |
| 9 | good | good | good | good | good |
| 10* | poor | poor | — | — | — |
| 11* | poor | average | poor | — | poor |
| 12* | poor | average | poor | — | poor |
| 13* | poor | good | poor | — | poor |

Note:
Samples marked with * are Comparative Examples.

As can be seen from Table 2, the master solder alloys of Samples 1 to 9 satisfying the requirements of the present invention achieved good results for all the characteristic evaluation items. More specifically, the Samples 1 to 9 could be formed into a wire and automatically wound up without breakage, and were therefore excellent in formability. Further, the Samples 1 to 9 were excellent in wettability on the Ag vapor-deposited surface. Particularly, the samples containing P very quickly spread over the Cu substrate, that is, the samples containing P thinly spread over the Cu substrate at the moment they came into contact with the Cu substrate. Further, the Samples 1 to 9 achieved good results also in the heat cycle test and the atmospheric heat resistance test for evaluating reliability. In the case of the heat cycle test, no defects were observed even after 500 cycles. In the case of the atmospheric heat resistance test, no defects were observed even after a lapse of 1000 hours.

On the other hand, the master solder alloys of Samples 10 to 13 prepared as Comparative Examples not satisfying the requirements of the present invention achieved poor results for at least any one of the characteristic evaluation items. More specifically, when each of the samples 10 to 13 was formed into a wire, breakage of the wire occurred at least once. Most of the Samples 10 to 13 were poor in wettability on the Ag vapor-deposited surface. In the case of the heat cycle test, defects were observed in all the Samples 10 to 13 after 300 cycles. In the case of the atmospheric heat resistance test, defects were observed in all the Samples 10 to 13 after a lapse of 1000 hours.

What is claimed is:

1. A Pb-free solder alloy, consisting of: between at least 0.03% by mass and at most 0.70% by mass of Al; between at least 0.2% by mass and at most 14.0% by mass of Zn; between 0.005% by mass and 0.500% by mass of P; and a balance being Bi except for inevitable impurities.

2. The Pb-free solder alloy of claim 1, wherein the content of P is between 0.246% by mass and 0.500% by mass.

3. The Pb-free solder alloy of claim 1, wherein the content of P is between 0.451% by mass and 0.500% by mass.

* * * * *